US007454505B2

(12) United States Patent
Kallner et al.

(10) Patent No.: US 7,454,505 B2
(45) Date of Patent: Nov. 18, 2008

(54) COMMUNICATION ENDPOINT SUPPORTING MULTIPLE PROVIDER MODELS

(75) Inventors: Samuel Kallner, Menashe (IL); Lev Kozakov, Stamford, CT (US); Alexey Roytman, Yokneam (IL); Uri Shani, Givat Adi (IL); Pnina Vortman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 10/053,872

(22) Filed: Jan. 24, 2002

(65) Prior Publication Data

US 2003/0058884 A1  Mar. 27, 2003

Related U.S. Application Data

(60) Provisional application No. 60/264,520, filed on Jan. 25, 2001.

(51) Int. Cl.
*G06F 15/16* (2006.01)

(52) U.S. Cl. .................................................. 709/227

(58) Field of Classification Search ......... 379/242–332, 379/180, 900, 221.02, 221.06–12, 221.15, 379/230; 717/118; 370/395.2, 395.5; 709/230, 709/238, 227; 719/328; 455/41.1
See application file for complete search history.

(56) References Cited

U.S. PATENT DOCUMENTS

| 6,185,289 B1 * | 2/2001 | Hetz et al. ............. 379/221.08 |
| 6,415,148 B1 * | 7/2002 | Chiniga et al. ............... 455/434 |
| 6,597,686 B1 * | 7/2003 | Smyk ......................... 370/352 |
| 6,724,780 B1 * | 4/2004 | Bhuyan et al. ............... 370/523 |
| 6,778,652 B2 * | 8/2004 | Gaus et al. ............. 379/201.01 |
| 6,888,937 B1 * | 5/2005 | Kurapati ................. 379/265.02 |
| 6,999,448 B1 * | 2/2006 | Klein ......................... 370/352 |

OTHER PUBLICATIONS

U.S. Appl. No. 60/264,520, "Hybrid JTAPI Provider Model", filed Jan. 25, 2001.
The Parlay Technical Team, "Parlay API's 2.1: Generic Call Control Service Interfaces", Jun. 26, 2000.
U.S. Appl. No. 09/896,107, "Virtual Call Center".
Java™ Telephony Specification, JTAPI version 1.3, Jun. 30, 1999.
Package javax.telephony, JTAPI version 1.3, Jun. 30, 1999.
"JAIN™ a set of Java™ APIs for integrated Networks", Jain Java Call Control (JCC) Application Programming Interface (API), version 1.0, Overview of the API, Jan. 19, 2001.
JAIN™ JCC Specification, obtained from the internet on Jan. 17, 2002, from http://jcp.org.jsr/detail/21/prt.

(Continued)

*Primary Examiner*—Andrew Caldwell
*Assistant Examiner*—Benjamin Ailes
(74) *Attorney, Agent, or Firm*—Browdy and Neimark, P.L.L.C.

(57) ABSTRACT

A method for communication includes receiving a request from a first party, submitted via a first communication service provider to a telephony application, to place a call using the application to a second party. Responsive to a characteristic of the call placed by the first party, a second communication service provider is selected to carry the call between the application and the second party. The second party is then connected via the second communication service provider to communicate with the first party using the application.

33 Claims, 4 Drawing Sheets

OTHER PUBLICATIONS

"JTAPI Intriduction", *The Source for Java™ Technology*, obtained from the internet on Dec. 27, 2001, from http://java.sun.com/products/jtapi/.

"An Introduction to JTAPI (Java Telephony API) Release 1.2, Rev. 0.7", obtained from the Internet Dec. 27, 2001, from http://java.sun.com/products/jtapi-1.2/JTAPIWhitePaper 0 7.html.

Microsoft, "Windows® Operating Systems: IP Telephony with TAPI 3.0", 1997.

"The Java Telephony API: An Overview", Version 1.2, Oct., 1997, obtained from the internet Dec. 27, 2001, from http://jaya.sun.com/products/jtapi-1.2/Overview.html.

"Java Telephony API Call Control Extension Package", Version 1.2, Oct., 1997, obtained from the internet Dec. 27, 2001, from http://java.sun.com/products/jtapi/jtapi-1.2/CallCtlOverview.html.

"User's Reference: Genetic JTAPI Reference Manual, Version 1.2", IBM Haifa research Lab, Jul. 2001.

U.S. Appl. No. 09/885,578, "Service Application Architecture for Integrated Network Service Providers".

U.S. Appl. No. 09/885,576, "Service Logic Execution Environment Connector to Client Interface".

U.S. Appl. No. 09/885,577, "Service Logic Execution Environment for Telecommunications Service Components".

"Jain™ Call Control API Enables Application Portability Across Heterogeneous Networks", obtained from the internet on Jan. 17, 2002, from http://java.sun.com/pr/2000/06/pr000606-11.html.

\* cited by examiner

COMMUNICATION ENDPOINT SUPPORTING MULTIPLE PROVIDER MODELS

CROSS-REFERENCE TO RELATED APPLICATION

This application claims the benefit of U.S. Provisional Patent Application 60/264,520, filed Jan. 25, 2001, which is incorporated herein by reference.

FIELD OF THE INVENTION

The present invention relates generally to communication systems, and specifically to computer telephony application support.

BACKGROUND OF THE INVENTION

The Java Telephony API (JTAPI) is a portable, object-oriented application programming interface for computer telephony applications written in the Java™ programming language. It is described in documents that are available at java.sun.com/products/jtapi. These documents include "The Java Telephony API: An Overview" (version 1.2, October, 1997) and "An Introduction to JTAPI (Java Telephony API)," by Spencer Dawkins (release 1.2, rev. 0.7, November, 1997), as well as the *JTAPI Telephony Specification* itself (version 1.3, June, 1999). All of these documents are incorporated herein by reference. JTAPI uses a "core plus extensions" structure, in which the "Core JTAPI" package includes the basic call object model used in placing, answering and terminating telephone calls, while the extension packages add features required by more advanced applications.

FIG. 1 is a block diagram that shows the basic elements of the JTAPI environment, as they are known in the art. JTAPI enables application vendors to write an application 20 that will provide value-added telephony services to the user, independent of the type of network 22 and communication protocol stack 24 that are used to carry the services. Examples of Java telephony applications (as listed on the above-mentioned JTAPI Web site) include:

Call logging and tracking
Auto-dialing
Screen-based telephone applications
Screen-pop software
Call routing applications
Automated attendants
Interactive voice response (IVR) systems
Agent software
Call center management
Fax send and receive
Voice mail.

These applications are listed by way of example, and by no means represent an exhaustive list of such applications.

In order to enable such telephony application services, the network provider must implement JTAPI provider software 28 that exposes an application programming interface (API) 26 complying with JTAPI specifications. The same API is exposed regardless of the underlying network platform: for example, network 22 may be a circuit-switched network, such as a public switched telephone network (PSTN) with a SS7 protocol stack or a private branch exchange (PBX) using proprietary protocols, or it may be a packet-switched network, such as an Internet Protocol (IP) network using a H.232 stack to carry voice over IP (VoIP). Because API 26 is uniform among all network types, application 20 should run transparently across all platforms. The application developer need only know that the provider supports the Java extension packages used by the application.

Provider implementations 28, however, are tightly bound with telephony stack 24 and must be written for the provider's specific telephony environment. The JTAPI specification does not give standard classes that can be reused across different provider platforms. Service providers must therefore develop their own implementations, after having first gained a sufficient understanding of Java, JTAPI and object-oriented programming methods. Furthermore, different providers may interpret the specification differently, so that their implementations may not exhibit completely uniform behavior in response to API calls. Multi-platform providers, such as call centers offering both PSTN and VoIP services, must develop separate implementations for each platform they support.

Along similar lines to JTAPI, Microsoft Corporation (Redmond, Wash.) offers a telephony API for Windows® operating systems known as "TAPI." This API is described in a white paper entitled, "IP Telephony with TAPI 3.0" (1997), which is available from Microsoft and is incorporated herein by reference. TAPI is said to enable convergence of traditional PSTN telephony and IP telephony, by providing generic methods for making connections between two or more machines, and accessing any media streams involved in the connections. In addition to its API for telephony applications, TAPI 3.0 also defines a standard Telephony Service Provider Interface (TSPI), for use by service providers in linking the TAPI protocol-independent call model with their own protocol-specific call control mechanisms.

Another, related environment for telephony application support is "Java APIs for Integrated Networks" (JAIN™), which is intended to be used in creating next-generation network services, which are portable across heterogeneous networks. JAIN is built around a Java Call Control (JCC) API, which is defined in the "JAIN JCC Specification" (Version 1.0, 2001), which is incorporated herein by reference. This specification is available at jcp.org/jsr/detail/21.prt. The JCC API is a Java interface for creating, monitoring, controlling manipulating and tearing down communications sessions in a converged PSTN, packet-switched and wireless environment. This API is meant to be consistent with JTAPI, although the JAIN call processing capabilities are not as extensive as those provided by JTAPI.

In addition, the JAIN JCC is designed for compatibility with "Parlay," a set of open APIs that have been standardized by an industry consortium known as the Parlay Group. Information regarding the Parlay Group is available at www.parlay.org. Relevant aspects of the Parlay APIs are described, for example, in a specification document entitled *Parlay APIs 2.1: Generic Call Control Service Interfaces* (June, 2000), which is incorporated herein by reference.

SUMMARY OF THE INVENTION

Preferred embodiments of the present invention provide a layered approach to telephony application support, which enables applications to work with multiple different provider implementations simultaneously. All the provider implementations interact with a common abstract call model through a standardized service provider interface. This approach allows multiple parties, supported by multiple different providers, to participate in a single, real-time hybrid call, without requiring the use of a dedicated gateway to link the different provider networks. For each party that joins the call, a provider management interface identifies and loads the appropriate provider implementation dynamically, so that the hybrid call can proceed transparently regardless of the different provider types that may become involved.

In some preferred embodiments of the present invention, the abstract call model is realized in a generic call control layer, such as a generic JTAPI or JAIN call control layer. This layer has both a standard application interface to telephony applications, conforming to the applicable specification, and a standard provider interface, as noted above, for serving multiple different providers. The call model used in the generic call control layer abstracts the common call control functions out of the provider implementations, thus simplifying and standardizing the work that providers must do to enable application support on their networks. Current JTAPI and JCC specifications do not define a provider interface of this sort. Whereas TAPI 3.0, as described above, does provide a common service provider interface for PSTN and IP telephony, it makes no provision for supporting hybrid calls or dynamically loading provider implementations in the course of a call, as does the present invention.

Although preferred embodiments are described herein with particular reference to the JTAPI and JCC specifications and call models, the principles of the present invention may similarly be applied using other abstract call models and interface conventions. As the methods and systems of the present invention may be applied to control not only voice calls, but also data and multimedia sessions, the term "call" as used herein should be understood to refer generally to any and all sorts of network communication sessions.

There is therefore provided, in accordance with a preferred embodiment of the present invention, a method for communication, including:

receiving a request from a first party, submitted via a first communication service provider to a telephony application, to place a call using the application to a second party;

responsive to a characteristic of the call placed by the first party, selecting a second communication service provider to carry the call between the application and the second party; and connecting the second party via the second communication service provider to communicate with the first party using the application.

Preferably, receiving the request includes submitting the request to the application via an application programming interface (API), which exposes a platform-independent call model to the application, and wherein connecting the second party includes connecting the call responsive to an instruction submitted by the application to the API. Typically, the first and second communication service providers have respective first and second telephony signaling stacks, and the call model includes an abstract call model that is independent of the telephony signaling stacks used in placing calls to and receiving calls from the application. Further preferably, receiving the request includes passing the request from the first telephony signaling stack to the abstract call model via a service provider interface of the call model, and connecting the second party includes passing signals to the second telephony signaling stack via the service provider interface, wherein the service provider interface is independent of the telephony signaling stacks.

Preferably, passing the request from the first telephony signaling stack includes using a first plug-in program to associate the signals in the first telephony signaling stack with corresponding elements of the service provider interface, and passing the signals to the second telephony signaling stack includes using a second plug-in program to associate the signals in the second telephony signaling stack with the corresponding elements of the service provider interface. Further preferably, selecting the second communication service provider includes selecting the second plug-in program from among a plurality of the plug-in programs that are provided for interacting with the abstract call model. Most preferably, selecting the second plug-in program includes passing information regarding the call to a service manager program via a service management interface of the abstract call model, wherein the service manager program processes the information to determine the characteristic, and selects the second plug-in program responsive to the characteristic from a registry of the plug-in programs.

In a preferred embodiment, receiving the request includes receiving an address of the second party to whom the call is to be placed, and selecting the second communication service provider includes parsing the address to determine the second communication service provider that should be selected. Typically, receiving the address includes receiving a telephone number, and parsing the address includes identifying the second communication provider based on a portion of the telephone number.

In another preferred embodiment, selecting the second communication service provider includes determining a communication protocol to be used in communicating with the second party, and choosing the second communication service provider such that the second communication service provider supports the communication protocol. Typically, receiving the request from the first party includes communicating with the first party via the first communication service provider using a first communication protocol, and the communication protocol used in communicating with the second party includes a second communication protocol, different from the first protocol. In some cases, one of the first and second communication protocols includes a circuit-switched network protocol, while the other of the first and second communication protocols includes a packet-switched network protocol.

In still another preferred embodiment, selecting the second communication service provider includes specifying a selection rule, and applying the selection rule to the characteristic in order to determine the second communication service provider to be selected. For example, specifying the selection rule may include specifying a temporal criterion, so that the second communication service provider is selected depending on a point in time at which the call is placed.

There is also provided, in accordance with a preferred embodiment of the present invention, a method for communication, including:

receiving a request from a first party, submitted to a telephony application, to place a call using the application to a second party;

processing the request to determine a service domain of the call;

responsive to the service domain, selecting a communication service provider to carry the call between the application and the second party; and connecting the second party via the communication service provider to communicate with the first party using the application.

Preferably, selecting the communication service provider includes providing a registry that lists a plurality of communication service providers and respective service characteristics thereof, and choosing the communication service provider to carry the call by comparing the service domain of the call to the service characteristics of the communication service providers in the registry.

In some preferred embodiments, processing the request includes determining the service domain by parsing an address of the second party to whom the call is to be placed. In one of these preferred embodiments, selecting the communication service provider includes selecting one of a plurality of wireless networks over which to make the call, dependent on the address of the second party.

In other preferred embodiments, the service domain is determined by a communication protocol to be used in communicating with the second party, and selecting the communication service provider includes choosing the communication service provider such that the communication service provider supports the communication protocol. In one of these preferred embodiments, processing the request to determine the service domain includes determining whether to use a circuit-switched network protocol or a packet-switched network protocol to communicate with the second party.

There is also provided, in accordance with a preferred embodiment of the present invention, communication apparatus, including:

a communication interface, arranged to communicate with first and second communication service providers; and a communication processor, arranged send and receive communications via the communication interface, and further arranged to run a telephony application, such that upon receiving a request from a first party, submitted via the first communication service provider to the telephony application, to place a call using the application to a second party, the processor selects, responsive to a characteristic of the call placed by the first party, a second communication service provider to carry the call between the application and the second party, and connects the second party via the second communication service provider to communicate with the first party using the application.

Preferably, the apparatus includes a memory, which is arranged to store a plurality of the plug-in programs that are provided for interacting with the abstract call model, and wherein the processor is arranged to select the second plug-in program from among the plurality of the plug-in programs in the memory.

In a preferred embodiment, the telephony application includes a teleconferencing application, and the processor is arranged to establish a teleconference between the first and second parties. In another preferred embodiment, the telephony application includes a call center application, and the processor is arranged to establish voice communications between a customer and a call center agent using the call center application.

There is further provided, in accordance with a preferred embodiment of the present invention, apparatus for communication, including:

a communication interface, arranged to communicate with multiple communication service providers; and a communication processor, arranged send and receive communications via the communication interface, and further arranged to run a telephony application, such that upon receiving a request from a first party, submitted to the telephony application, to place a call using the application to a second party, the processor processes the request to determine a service domain of the call and, responsive to the service domain, selects one of the communication service providers to carry the call between the application and the second party, and connects the second party via the selected communication service provider to communicate with the first party using the application.

There is moreover provided, in accordance with a preferred embodiment of the present invention, a conference bridge, including:

a communication interface, arranged to communicate with first and second communication service providers; and a communication processor, arranged send and receive communications via the communication interface, and further arranged to run a teleconferencing application, such that upon receiving a request from a first party, submitted via the first communication service provider to the teleconferencing application, to establish a teleconference using the application with a second party, the processor selects, responsive to a characteristic of the call placed by the first party, a second communication service provider to carry the call between the application and the second party, selecting, and connects the second party via the second communication service provider to communicate with the first party using the application.

Preferably, the bridge includes a media gateway, which is arranged to transcode media communications carried between the first and second communication service providers, in accordance with transcoding instructions from the communication processor, dependent on the selected communication service providers.

There is additionally provided, in accordance with a preferred embodiment of the present invention, contact center apparatus, for operation by an agent in the contact center, the apparatus including:

a first communication interface, arranged to communicate with first communication service provider on a circuit-switched communication link;

a second communication interface, arranged to communicate with a second communication service provider on a packet-switched communication link; and a communication processor, arranged send and receive communications via the communication interfaces, and further arranged to run a contact center application, such that upon receiving a request from an agent operating the apparatus, submitted to the application, to place a call using the application to a specified party, the processor processes the request to determine whether the call is to be carried on the circuit-switched link or the packet-switched link and accordingly selects one of the communication service providers to carry the call between the application and the specified party, and connects the specified party via the selected communication service provider to communicate with the agent using the application.

Preferably, the processor is arranged to connect the agent to communicate with a first party via the circuit-switched link and with a second party via the packet-switched link simultaneously, in the same call.

There is furthermore provided, in accordance with a preferred embodiment of the present invention, a wireless telephone, including:

a communication interface, arranged to communicate over the air with first and second wireless communication service providers over respective first and second air interfaces; and a communication processor, arranged send and receive communications via the communication interface, and further arranged to run a telephony application, such that upon receiving a request from a user of the telephone, submitted to the application, to place a call using the application to a specified party, the processor processes the request to determine whether the call is to be carried by the first or the second wireless communication service provider and accordingly selects one of the air interfaces to use in carrying the call between the application and the specified party, and establishes the call via the selected service provider using the respective first or second air interface.

There is also provided, in accordance with a preferred embodiment of the present invention, a computer software product, including a computer-readable medium in which program instructions are stored, which instructions, when read by a computer that is arranged to communicate with first and second communication service providers, cause the computer to run a telephony application, such that upon receiving a request from a first party, submitted via the first communication service provider to the telephony application, to place a call using the application to a second party, the computer selects, responsive to a characteristic of the call placed by the first party, a second communication service provider to carry the call between the application and the second party, and connects the second party via the second communication service provider to communicate with the first party using the application.

There is further provided, in accordance with a preferred embodiment of the present invention, a computer software product, including a computer-readable medium in which program instructions are stored, which instructions, when read by a computer that is arranged to communicate with multiple communication service providers, cause the computer to run a telephony application, such that upon receiving a request from a first party, submitted to the telephony application, to place a call using the application to a second party, the computer processes the request to determine a service domain of the call and, responsive to the service domain, selects one of the communication service providers to carry the call between the application and the second party, and connects the second party via the selected communication service provider to communicate with the first party using the application.

The present invention will be more fully understood from the following detailed description of the preferred embodiments thereof, taken together with the drawings in which:

DETAILED DESCRIPTION OF PREFERRED EMBODIMENTS

Figure 2:
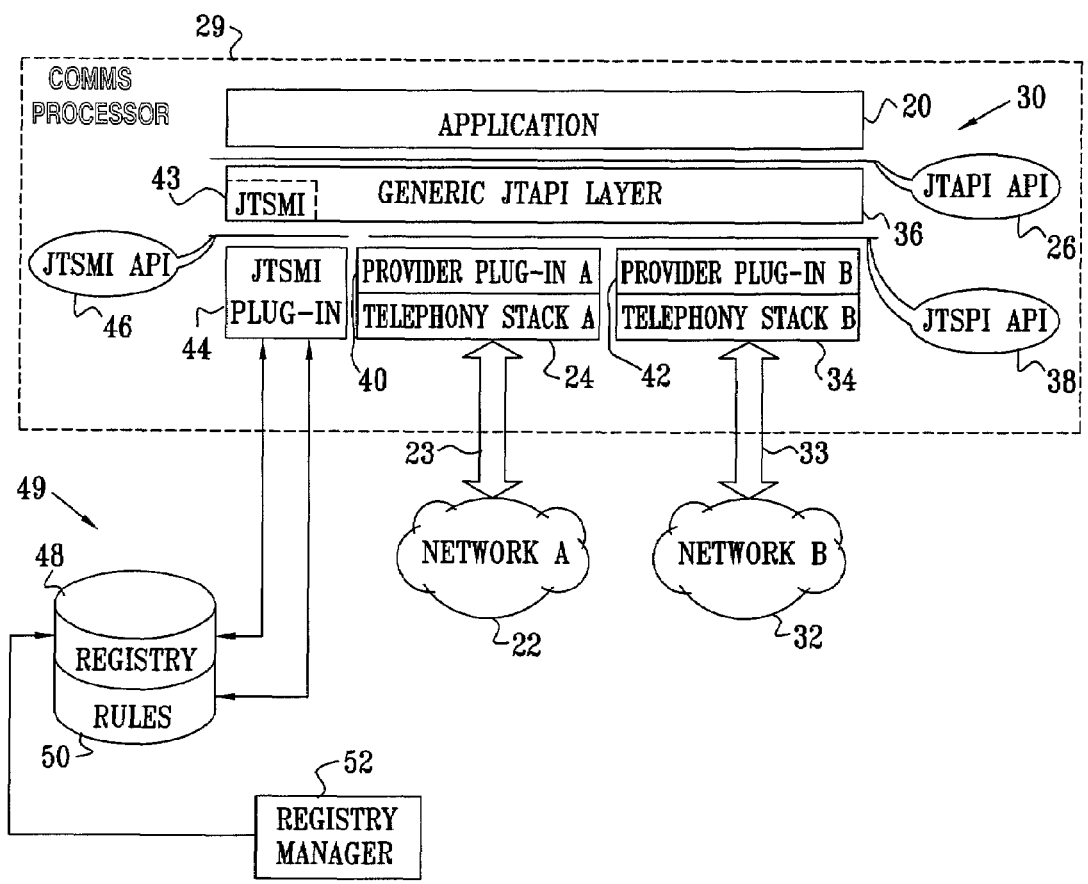
FIG. 2 is a block diagram that schematically illustrates a software structure for telephony application support with a hybrid provider model, in accordance with a preferred embodiment of the present invention.

Reference is now made to FIG. 2, which is a block diagram that schematically illustrates a software structure 30 for JTAPI application support with a hybrid provider model, in accordance with a preferred embodiment of the present invention. The structure shown in FIG. 2 enables application 20 to operate simultaneously over multiple provider networks 22, 32, each with its respective telephony stack 24, 34, while using the standard JTAPI application program interface 26. (Although for simplicity of illustration, only two different provider networks 22 and 32 are shown in this figure, structure 30 is similarly capable of supporting three or more provider networks simultaneously, as will be apparent to those skilled in the art.) Application 20 is unaware of the number and types of provider implementations that it is using and may comprise substantially any sort of JTAPI application known in the art.

Because of the close similarity between the JTAPI call control model and the JCC API specified by JAIN, a structure substantially identical to structure 30 may similarly be used to provide JCC application support. Therefore, in the description of the embodiments shown in FIGS. 2-5, references to JTAPI should be understood as being equivalently applicable to JCC, unless specifically noted otherwise.

Structure 30 is typically implemented in a software package or packages running on a communications processor 29, typically a suitable general- or special-purpose computer processor. This software may be downloaded to the appropriate processor in electronic form, over a network, for example, or it may alternatively be furnished on tangible media, such as CD-ROM. Processor 29 has communication interfaces 23 and 33 for communicating with networks 22 and 32, respectively.

The core of structure 30 is a generic JTAPI layer 36, which encapsulates the logic of the common functions that must be provided in order to support API 26, regardless of the specific provider implementation. The design and operation of layer 36 are described in detail in U.S. patent applications Ser. Nos. 09/885,576, 09/885,577 and 09/885,588, which are assigned to the assignee of the present patent application, and whose disclosures are incorporated herein by reference. Although the descriptions of the inventions made in these applications refer specifically to JAIN specifications, their extension to JTAPI-based systems is straightforward, for the reasons explained above.

Generic JTAPI layer 36 contains a kernel of the call model objects required by JTAPI in an abstract, provider-independent form. These objects cover both the basic call control functions and, preferably, the optional features provided by JTAPI extension packages, as well. Each conventional JTAPI call model component has a corresponding generic class in layer 36, which implements the capabilities required by the component. The call model objects in the generic layer kernel respond to calls from API 26 and change their states in a consistent manner that is independent of the underlying supplier networks 22, 32 that may be invoked by such calls.

Figure 1:
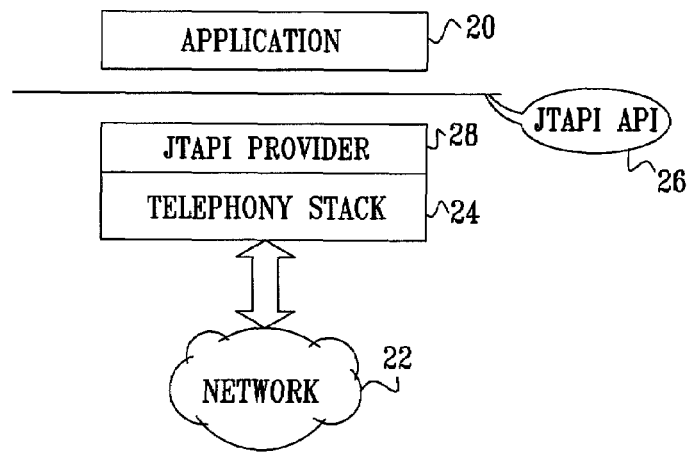
FIG. 1 is a block diagram that schematically illustrates a software structure for telephony application support, as is known in the art.

In addition, layer 36 contains a provider interface framework, with a well-defined API 38 for use by network service providers. This API is referred to herein as the Java Telephony Service Provider Interface (JTSPI). The objects in the provider interface bind the functions of API 38 to the generic call model objects in the kernel of layer 36. To interact with generic layer 36, network service providers write plug-in modules 40, 42, with methods that associate the elements of their respective telephony stacks 24, 34 with the appropriate functions of API 38. Thus, plug-in 40 typically includes methods that associate the abstract objects used in connecting, answering and disconnecting calls in layer 36, via the framework exposed at API 38, with the signaling used for these functions in stack 24 of network 22. Unlike the conventional approach shown in FIG. 1, structure 30 relieves the provider of the need to write the JTAPI call model objects that actually implement these methods. JTSPI API 38 also provides (like JTAPI API 26) optional functions that the network service provider can use to link the advanced features of the JTAPI extension packages with the appropriate signaling functions in the telephony stack.

For example, Table I below shows some typical mappings between JTSPI method calls or functions and the corresponding messages that are sent by plug-in 40 to a SS7 network (such as a PSTN), using the SS7 ISDN User Part (ISUP) protocol. Table II shows some events that might be generated at JTSPI API 38 in response to ISUP messages from network 22. These events are processed by generic layer 36 and are passed on to application 20 via API 26 as appropriate.

TABLE I

JTSPI TO ISUP MAPPING

| JTSPI call | ISUP message |
|---|---|
| ConnectDestination | IAM |
| DestinationIsRinging | ACM |
| answer | ANM |
| release | REL |

TABLE II

ISUP TO JTSPI MAPPING

| ISUP message | JTSPI event |
|---|---|
| IAM | IncomingCallEvent |
| ACM | PartyRingingEvent |
| ANM | PartyConnectedEvent |
| REL | PartyReleasedEvent or PartyFailureEvent (depending on cause code) |
| RSC | PartyFailureEvent |

The above correspondences are listed here by way of example, and the extension of these lists to other functions, events and messages will be apparent to those skilled in the art.

The operation of generic JTAPI layer 36 in handling a call is thus independent of the choice of supplier networks 22, 32 and the corresponding telephony stacks 24, 34 that actually carry the call signaling. This paradigm allows the generic layer to handle hybrid calls, between networks 22 and 32, in the same manner as it handles homogeneous calls within a single network.

The choice of which network service providers to use (and thus which plug-ins 40, 42 to load) for a particular call is made by a by a Java Telephony Service Management Interface (JTSMI) component 43 of generic JTAPI layer 36. JTSMI component 43 communicates with a JTSMI plug-in 44 via a JTSMI API 46. This API is used to pass call information, such as the telephone number of a called party, from layer 36 to JTSMI plug-in 44, and to return instructions regarding selection of supplier plug-ins 40, 42 from plug-in 44 to component 43 of layer 36. In choosing the service providers, the JTSMI plug-in refers to a registry 48, containing configuration files for each of the available service providers, which indicate the providers' respective capabilities. The JTSMI plug-in may also refer to programmable rules 50, which associate particular service domains with corresponding providers and service types. Registry 48 and rules 50 are typically held in a memory 49 that is accessed by processor 29.

JTSMI API 46 is provided in order to enable application developers to create and use their own structures of registry 48 and rules 50, without being bound in advance by particular types of data structures or database programming languages. Alternatively, the functions of JTSMI plug-in 44 may be incorporated into JTSMI component 43, as long as the registry and rules observe a predefined structure required by the JTSMI component.

JTSMI plug-in 44 may use the information in registry 48 and rules 50 in a large variety of different ways to resolve the service domain for each call and to choose the service providers accordingly, for example:

Address resolution, using the address (typically the telephone number) of the called party to choose the provider who is to carry the call. Telephone area codes, for example, may be used to distinguish between PSTN and VoIP carriers, or between different cellular network operators.

Protocol selection, depending on the communication protocol required to make the call. If a given network device has the ability to communicate using multiple different protocols, the JTSMI plug-in may choose a provider to use for a given call depending on the desired protocol for the call, for example, choosing to make the call over a PSTN or IP network.

Resource requirements of application 20, which may call on capabilities specified by JTAPI extension packages that are not supported by all providers. In such a case, the JTSMI plug-in will choose only providers who have the required capabilities, according to registry 48.

Time resolution, wherein the criteria for selection of a provider may vary depending on the time or day. For example, rules 50 may specify the choice of a VoIP provider during daytime hours, and a PSTN provider in the evening and on weekends.

The term "service domain," according to which the JTSMI plug-in associates a call with a given provider, should thus be understood broadly to encompass any criterion or set of criteria that can be used to distinguish among types, classes or categories of telephony services for the purpose of choosing a service provider.

The configuration files in registry 48 are input and updated by a system administrator using an external utility program, referred to as a registry manager 52. The configuration files include a main configuration file (genjtapi.cfg), which lists the services available and their corresponding configuration files. Every service has a corresponding plug-in 40, 42 that can be loaded. For each available service plug-in, there is a service configuration file, which holds information about the names of the JTSPI and JTSMI classes for the service provider, preferably in the form of a XML file that specifies the mapping between providers and class names. Either the service configuration file or the main configuration file also contains the name of a resource configuration file for each provider record.

Table III below lists a sample service configuration file for an ISUP plug-in, written in XML, by way of example. This file, named uisup.xml, contains general purpose configuration attributes, logging configuration attributes, and a list of remote point codes (in accordance with SS7 network standards) that manage circuits:

TABLE III

SERVICE CONFIGURATION FILE FOR ISUP SERVICE

<service isupVariat="a7" noAnswer="0" locaPC="10-1-1"
    node="a7nl" host="localhost" spn="0" prefix="06"
    maxActvConns="100" addressType="4">

TABLE III-continued

SERVICE CONFIGURATION FILE FOR ISUP SERVICE

```
    <pointCodes>
        <pointCode rpc="10-1-2" prefix="04">
            <circuitID start="1" end="4"
                usage="outgoing"/>
            <circuitID start="5" end="8"
                usage="incoming"/>
            <circuitID start="9" end="12"
                usage="both"/>
            <circuitID start="13" end="24"
                usage "incoming"/>
        </pointCode>
    </pointCodes>
    <log name="JTPSILog" value="true"/>
</service>
```

A "plugin" tag for this service should be added to the main configuration file, typically having the general form shown below in Table IV:

TABLE IV

PLUGIN TAG FOR ISUP SERVICE

```
<plugin className="jtspi.uisup.UisupProviderPlugin"
        serviceName="uisup"
        configData="conf/uisup.xml">
    <resourceFile className="jtapi.util.XmlResourceIsup"
            configData="conf/uisupaddr.xml"/>
</plugin>
```

The resource configuration files in registry 48 define local endpoints that are associated with each service provider and service domain. The endpoints are defined in terms of both their addresses (such as telephone numbers) and their terminal identification, in accordance with JTAPI convention. Thus, each record in the resource configuration file includes the endpoint address name, along with the list of associated terminal names, as well as the service provider and resource requirements, for use by JTSMI plug-in 44 in service provider selection, as described above. In addition to the addresses, the end-point information may include alias addresses (such as 1-800 numbers), owner ID, location of endpoints (for wireline communications) and dynamic updates, such as presence and location information for both wireline and wireless communications. This information may be dynamically updated under the control of registry manager 52.

Upon initialization of a communication device based on structure 30, a JtapiArranger class in generic layer 36 starts loading the main configuration file. As a result of this operation, the above-mentioned configuration structures are created and registered in a single instance of a JtsmiRegistry class. JTAPI provider instances are then created for each specific service. This operation starts with creating provider service object adapters for each registered specific implementation of a ProviderService class. Then, a new instance of the JTAPI Provider class is created and initialized, using an identifier string passed by the application.

At runtime, the service domain for each endpoint is resolved by a DomainManager class of JTSMI component 43, which tests the endpoint against particular service domain characteristics. This testing is performed using specific implementations of an abstract ManagerService class, which are created by each specific service provider to enable testing of endpoints against its service domain.

Figure 3:
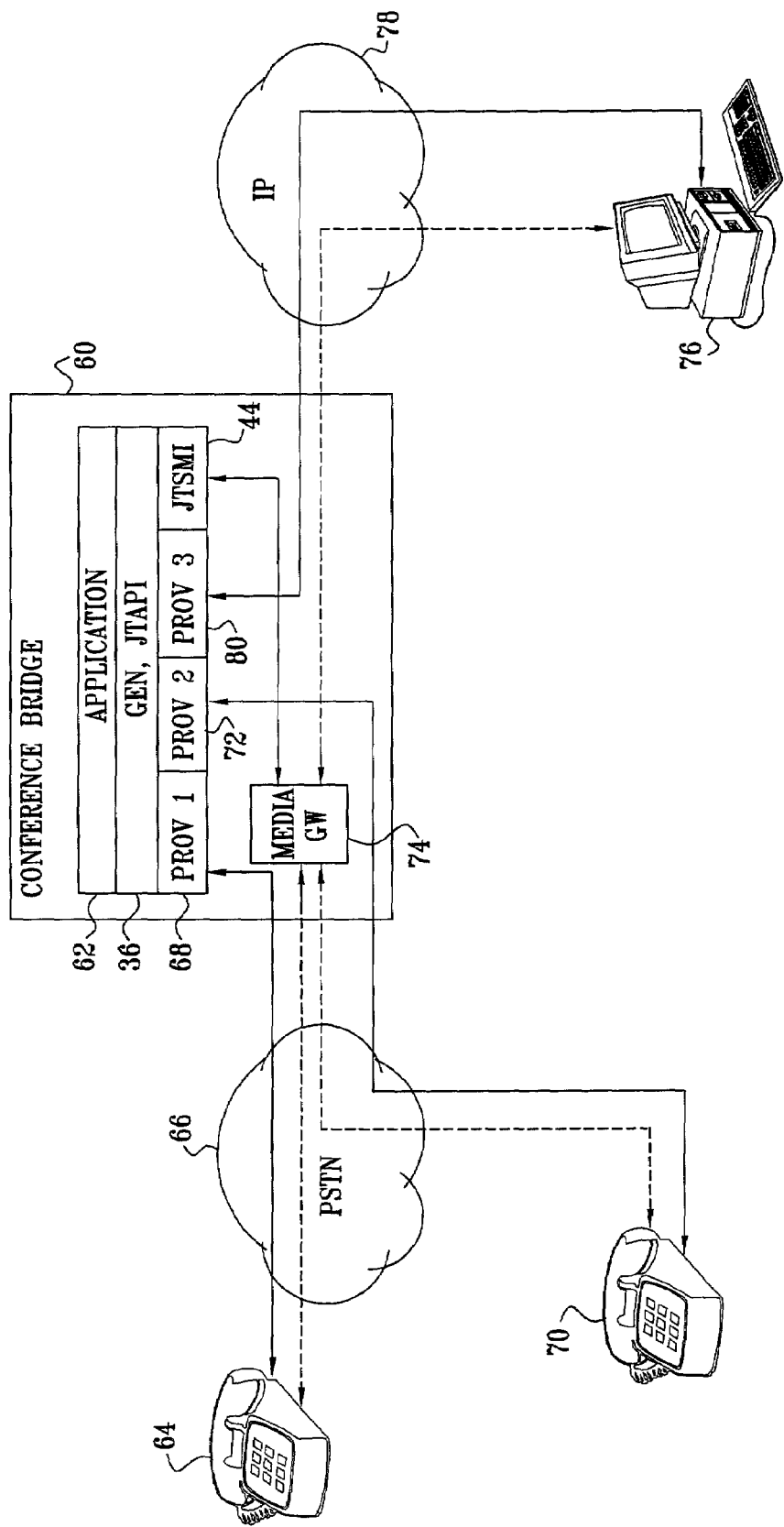
FIG. 3 is a block diagram that schematically illustrates a teleconference bridge, in accordance with a preferred embodiment of the present invention.

FIG. 3 is a block diagram that schematically illustrates a hybrid conference bridge 60, based on the principles described above, in accordance with a preferred embodiment of the present invention. Bridge 60 comprises a suitable host computer with interfaces to a variety of different communication networks including, in the present example, PSTN 66 and an IP network 78. Conference signaling is handled by a teleconferencing application 62 running on the bridge, while media transcoding between networks 66 and 78 is performed by a media gateway 74, as is known in the art.

A first caller initiates a teleconference by dialing in to gateway 60 from a telephone 64 via PSTN 66. The incoming call is handled by a PSTN provider plug-in 68. By interacting with application 62 using telephone 64, the first caller inputs the addresses of two additional conference participants: one participant who will use a telephone 70 to communicate via PSTN 66, and another who will use a computer 76 to communicate via IP network 78. Typically, the address of telephone 70 is simply its telephone number, while that of computer 76 may be an IP address or a VoIP telephone number.

Application 62 passes the addresses of telephone 70 and computer 76 via generic JTAPI layer 36 to JTSMI plug-in 44. The JTSMI plug-in checks registry 48 and determines that a PSTN provider plug-in 72 is required to handle telephone 70, while a VoIP provider plug-in 80 is required for computer 76. Layer 36 loads the required plug-ins dynamically, as part of setting up the call. Each leg of the call thus has its own plug-in instance, which may be of any type for which registry 48 contains a suitable entry. If another participant joins the teleconference in progress, the appropriate provider plug-in for the new participant will be loaded in like manner. From the point of view of the kernel functions of layer 36, however, all the legs of the call function identically. Based on the different service types that it has resolved for the different participants, JTSMI plug-in 44 instructs media gateway 74 on the proper transcoding to be applied to the media stream that is output to each participant.

Figure 4:
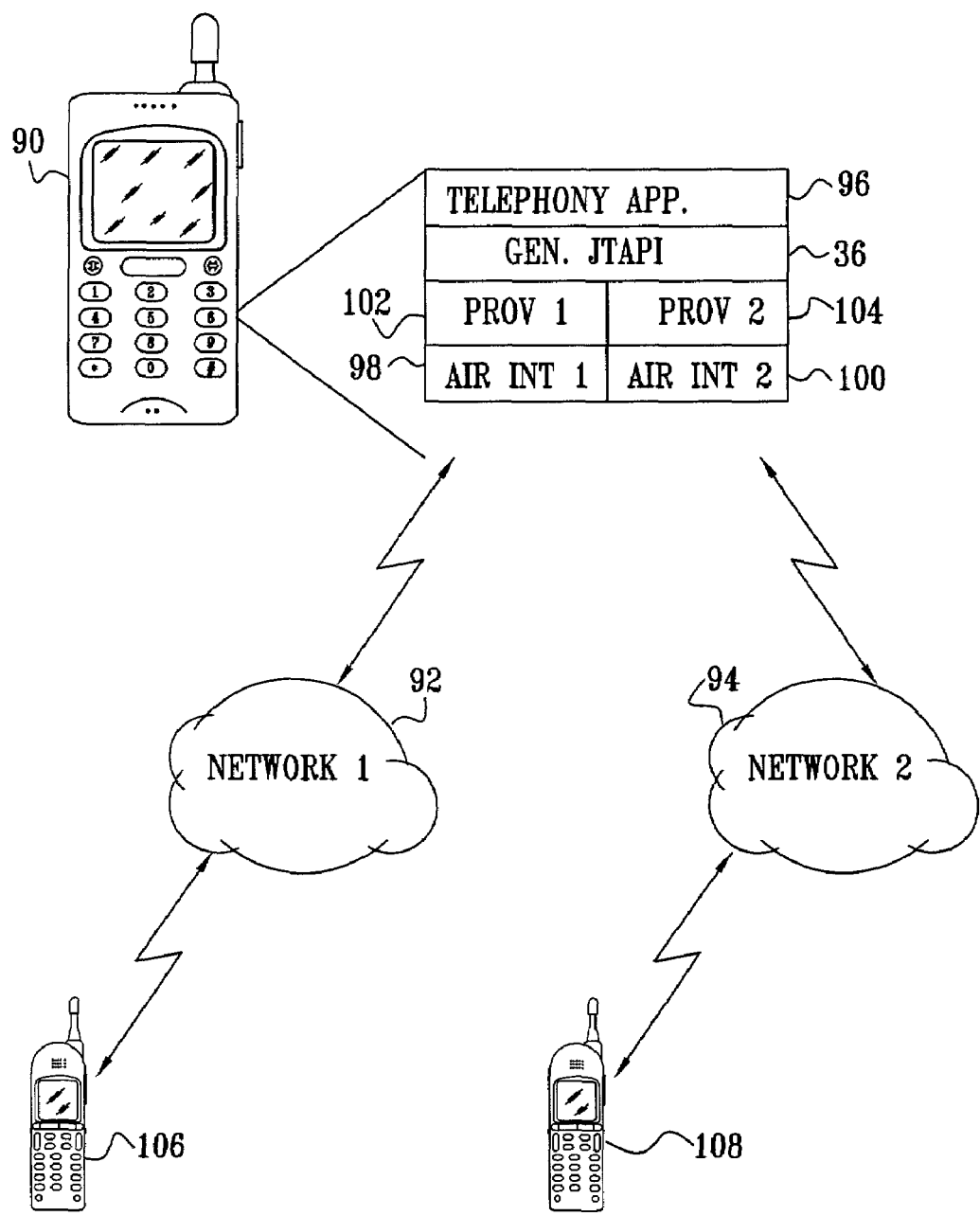
FIG. 4 is a block diagram that schematically illustrates a wireless telephone accessing multiple provider networks, in accordance with a preferred embodiment of the present invention.

FIG. 4 is a block diagram that schematically illustrates a mobile telephone 90, which uses generic JTAPI layer 36 in accessing two different wireless networks 92 and 94, in accordance with a preferred embodiment of the present invention. In this respect, telephone 90 can be viewed as a sort of "single-line gateway." In the present example, it is assumed that networks 92 and 94 use different air interfaces, so that telephone 90 is equipped with different telephony stacks 98 and 100, in accordance with the respective protocols used in the two networks. For example, network 92 may be an IS-95 network with a Code Division Multiple Access (CDMA) air interface, while network 94 is a GSM network using a Time Division Multiple Access (TDMA) air interface. Telephony stacks 98 and 100 for the two air interfaces are linked to the generic JTAPI layer by respective provider plug-ins 102 and 104.

To place a call, a user of telephone 90 inputs the destination address of the call, typically a cellular telephone number or a Wireless Access Protocol (WAP) uniform resource identifier (URI). A telephony application 96 passes the address to the JTSMI plug-in (omitted from this figure for simplicity), in order to determine which network should be used to place the call. Cellular telephone numbers, for example, generally have an area code or prefix that identifies the cellular service provider. Based on the identification of the service provider returned by the JTSMI plug-in, generic JTAPI layer 36 loads provider plug-in 102 to communicate with a subscriber 106 on network 92, or provider plug-in 104 to communicate with a subscriber 108 on network 94. Alternatively or additionally, the JTSMI plug-in may select the network to use based on the time of day or other criteria, so as to take advantage of discount rates offered by the different cellular providers at different times, for example. The user of telephone 90 may thus realize substantial savings on telephone bills by making each call automatically over the most advantageous network.

Figure 5:
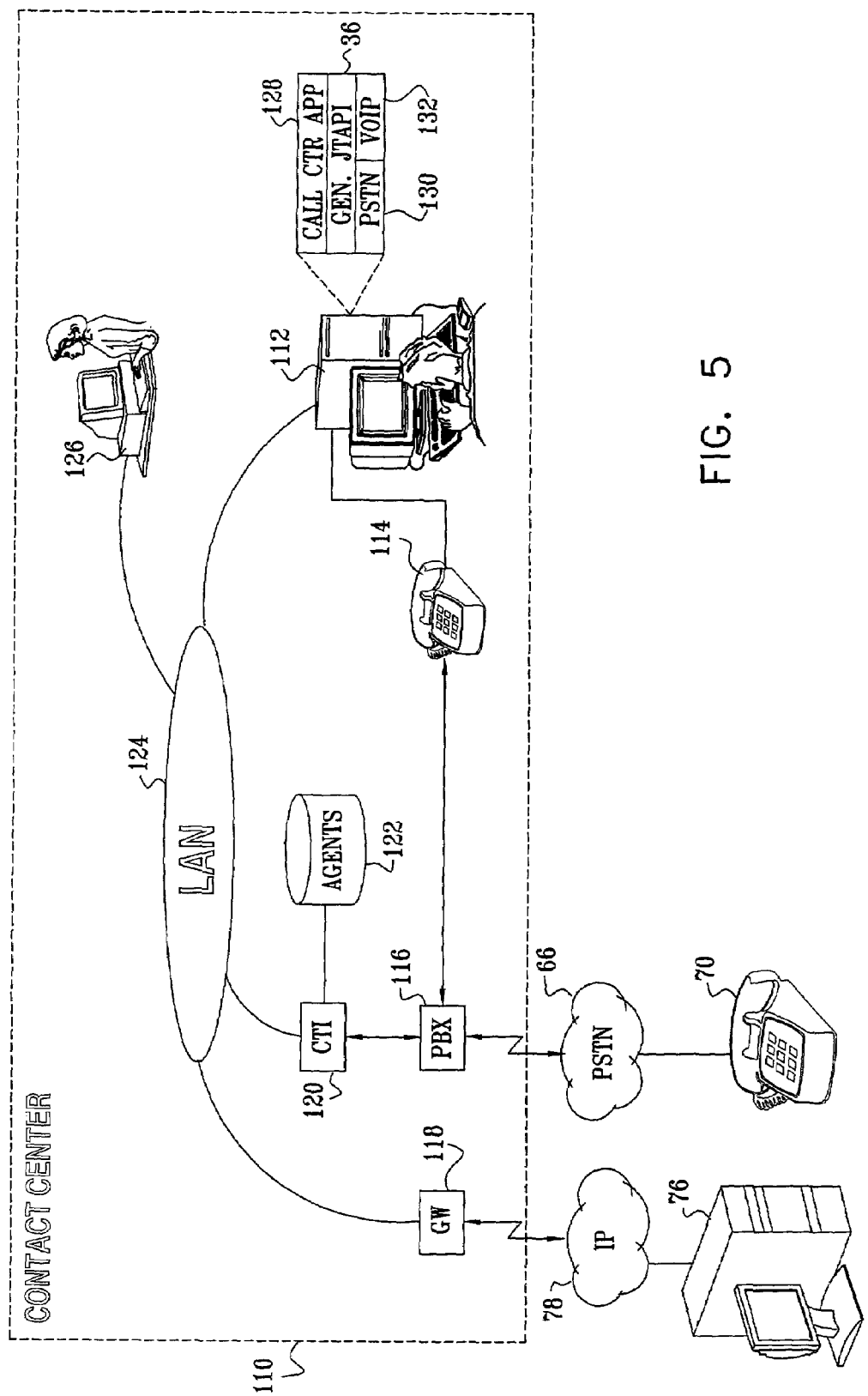
FIG. 5 is a block diagram that schematically illustrates a hybrid call center, in accordance with a preferred embodiment of the present invention.

FIG. 5 is a block diagram that schematically illustrates a contact center 110 (also referred to as a call center) that supports hybrid calls, in accordance with a preferred embodiment of the present invention. Typically, an agent station in the contact center comprises a computer 112 and a telephone 114. The telephone is configured to place and receive calls via a private branch exchange (PBX) switch 116. The agent may also receive VoIP calls, as well as e-mail and text chat communications, via a gateway 118. Incoming calls are handled by a Computer Telephony Integration (CTI) server 120, which decides to whom such calls should be routed based on a database 122 that it maintains of the agents' skills and availability. The elements of contact center 110 are interconnected by a local area network (LAN) 124. Further aspects of the operation of contact center 110 and agent stations associated therewith are described in U.S. patent application Ser. No. 09/896,107, which is assigned to the assignee of the present patent application, and whose disclosure is incorporated herein by reference.

In order to route calls to agents in the contact center and to track handling of calls by the agents, CTI server 120 communicates with a call center application 128 running on computer 112 of each agent. Computer 112 and telephone 114 are preferably configured so that the telephone functions both as an extension of PBX 116 for calls on PSTN 66 and as a handset for VoIP calls on network 78. Further preferably, application 128 provides the agent with on-screen information regarding both PSTN and VoIP calls that the agent is conducting, and tracks the status of both types of calls for reporting to CTI server 120. To facilitate these functions, application 128 interacts with generic JTAPI layer 36, which is able to load both a PSTN plug-in 130 and a VoIP plug-in 132.

This software structure enables call center application 128 to handle voice calls transparently, with substantially identical functionality, regardless of whether the calls are carried over PSTN 66 or IP network 78. The contact center agent can also use application 128 to carry out hybrid PSTN/VoIP calls. For example, if during a PSTN call with a customer using telephone 70, the agent decides it would be desirable to involve a supervisor in the discussion, he can conference in the supervisor by opening a VoIP link over LAN 124 to a terminal 126 used by the supervisor. In this case, generic JTAPI layer 36 loads PSTN plug-in 130 to handle the customer leg of the call, following which VoIP plug-in 132 is dynamically loaded to handle the supervisor leg.

Although preferred embodiments are described herein with particular reference to the JTAPI and JAIN specifications and call models, the principles embodied in structure 30 may similarly be applied using other abstract call models and interface conventions, including (though not limited to) the conventions of the above-mentioned TAPI 3.0 specification. For example, structure 30 may be adapted to work with the call model and interfaces of the Intelligent Network Application Protocol (INAP). It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
   receiving a request from a first party, submitted via a first communication service provider to a telephony application, to place a call using the application to a second party;
   responsive to a characteristic of the call placed by the first party, selecting a second communication service provider to carry the call between the application and the second party; and
   connecting the second party via the second communication service provider to communicate with the first party using the application,
   wherein receiving the request comprises submitting the request to the application via an application programming interface (API), which exposes a platform-independent call model to the application, and wherein connecting the second party comprises connecting the call responsive to an instruction submitted by the application to the API, and
   wherein the first and second communication service providers have respective first and second telephony signaling stacks, and wherein the call model comprises an abstract call model that is independent of the telephony signaling stacks used in placing calls to and receiving calls from the application.

2. A method according to claim 1, wherein receiving the request comprises passing the request from the first telephony signaling stack to the abstract call model via a service provider interface of the call model, and wherein connecting the second party comprises passing signals to the second telephony signaling stack via the service provider interface, wherein the service provider interface is independent of the telephony signaling stacks.

3. A method according to claim 2, wherein passing the request from the first telephony signaling stack comprises using a first plug-in program to associate the signals in the first telephony signaling stack with corresponding elements of the service provider interface, and wherein passing the signals to the second telephony signaling stack comprises using a second plug-in program to associate the signals in the second telephony signaling stack with the corresponding elements of the service provider interface.

4. A method according to claim 3, wherein selecting the second communication service provider comprises selecting the second plug-in program from among a plurality of the plug-in programs that are provided for interacting with the abstract call model.

5. A method according to claim 4, wherein selecting the second plug-in program comprises passing information regarding the call to a service manager program via a service management interface of the abstract call model, wherein the service manager program processes the information to determine the characteristic, and selects the second plug-in program responsive to the characteristic from a registry of the plug-in programs.

6. A method according to claim 1, wherein receiving the request comprises receiving an address of the second party to whom the call is to be placed, and wherein selecting the second communication service provider comprises parsing the address to determine the second communication service provider that should be selected.

7. A method according to claim 6, wherein receiving the address comprises receiving a telephone number, and wherein parsing the address comprises identifying the second communication provider based on a portion of the telephone number.

8. A method according to claim 1, wherein selecting the second communication service provider comprises determining a communication protocol to be used in communicating with the second party, and choosing the second communication service provider such that the second communication service provider supports the communication protocol.

9. A method according to claim 8, wherein receiving the request from the first party comprises communicating with the first party via the first communication service provider using a first communication protocol, and wherein the communication protocol used in communicating with the second party comprises a second communication protocol, different from the first protocol.

10. A method according to claim 9, wherein one of the first and second communication protocols comprises a circuit-switched network protocol, while the other of the first and second communication protocols comprises a packet-switched network protocol.

11. A method according to claim 1, wherein selecting the second communication service provider comprises specifying a selection rule, and applying the selection rule to the characteristic in order to determine the second communication service provider to be selected.

12. Communication apparatus, comprising:
a communication interface, arranged to communicate with first and second communication service providers; and
a communication processor, arranged to send and receive communications via the communication interface, and further arranged to run a telephony application, such that upon receiving a request from a first party, submitted via the first communication service provider to the telephony application, to place a call using the application to a second party, the processor selects, responsive to a characteristic of the call placed by the first party, a second communication service provider to carry the call between the application and the second party, and connects the second party via the second communication service provider to communicate with the first party using the application,
wherein the processor is arranged so that the request is submitted to the application via an application programming interface (API), which exposes a platform-independent call model to the application, and so that the call is connected to the second party responsive to an instruction submitted by the application to the API, and
wherein the first and second communication service providers have respective first and second telephony signaling stacks, and wherein the call model comprises an abstract call model that is independent of the telephony signaling stacks used in placing calls to and receiving calls from the application.

13. Apparatus according to claim 12, wherein the processor is arranged so that the request is passed from the first telephony signaling stack to the abstract call model via a service provider interface of the call model, and so that the call is connected to the second party by passing signals to the second telephony signaling stack via the service provider interface, wherein the service provider interface is independent of the telephony signaling stacks.

14. Apparatus according to claim 13, wherein the processor is arranged so that the request is passed from the first telephony signaling stack to the abstract call model using a first plug-in program to associate the signals in the first telephony signaling stack with corresponding elements of the service provider interface, and wherein the signals are passed to the second telephony signaling stack using a second plug-in program to associate the signals in the second telephony signaling stack with the corresponding elements of the service provider interface.

15. Apparatus according to claim 14, and comprising a memory, which is arranged to store a plurality of the plug-in programs that are provided for interacting with the abstract call model, and wherein the processor is arranged to select the second plug-in program from among the plurality of the plug-in programs in the memory.

16. Apparatus according to claim 15, wherein the processor is arranged to select the second plug-in program by passing information regarding the call to a service manager program via a service management interface of the abstract call model, wherein the service manager program processes the information to determine the characteristic, and selects the second plug-in program responsive to the characteristic from a registry of the plug-in programs.

17. Apparatus according to claim 12, wherein the request comprises an address of the second party to whom the call is to be placed, and wherein the processor is arranged to parse the address to determine the second communication service provider that should be selected.

18. Apparatus according to claim 17, wherein the address comprises a telephone number, and wherein the processor is arranged to identify the second communication provider based on a portion of the telephone number.

19. Apparatus according to claim 12, wherein the processor is arranged to determine a communication protocol to be used in communicating with the second party, and to choose the second communication service provider such that the second communication service provider supports the communication protocol.

20. Apparatus according to claim 19, wherein the processor is arranged to communicate with the first party via the first communication service provider using a first communication protocol, and wherein the communication protocol used in communicating with the second party comprises a second communication protocol, different from the first protocol.

21. Apparatus according to claim 20, wherein one of the first and second communication protocols comprises a circuit-switched network protocol, while the other of the first and second communication protocols comprises a packet-switched network protocol.

22. Apparatus according to claim 12, wherein the processor is arranged to select the second communication service provider by applying a selection rule to the characteristic in order to determine the second communication service provider to be selected.

23. A computer software product, comprising a computer-readable medium in which program instructions are stored, which instructions, when read by a computer that is arranged to communicate with first and second communication service providers, cause the computer to run a telephony application, such that upon receiving a request from a first party, submitted via the first communication service provider to the telephony application, to place a call using the application to a second party, the computer selects, responsive to a characteristic of the call placed by the first party, a second communication service provider to carry the call between the application and the second party, and connects the second party via the second communication service provider to communicate with the first party using the application,
wherein the instructions cause the computer to submit the request to the application via an application programming interface (API), which exposes a platform-independent call model to the application, and so that the call is connected to the second party responsive to a response submitted by the application to the API, and wherein the first and second communication service providers have respective first and second telephony signaling stacks, and wherein the call model comprises an abstract call model that is independent of the telephony signaling stacks used in placing calls to and receiving calls from the application.

24. A product according to claim 23, wherein the instructions cause the computer to pass the request from the first telephony signaling stack to the abstract call model via a service provider interface of the call model, and so that the call is connected to the second party by passing signals to the second telephony signaling stack via the service provider interface, wherein the service provider interface is independent of the telephony signaling stacks.

25. A product according to claim 24, wherein the instructions cause the computer to pass the request from the first telephony signaling stack to the abstract call model, using a first plug-in program to associate the signals in the first telephony signaling stack with corresponding elements of the service provider interface, and to pass the signals to the second telephony signaling stack using a second plug-in program to associate the signals in the second telephony signaling stack with the corresponding elements of the service provider interface.

26. A product according to claim 25, wherein the instructions cause the computer to select the second plug-in program from among a plurality of the plug-in programs that are provided for interacting with the abstract call model.

27. A product according to claim 26, wherein the instructions cause the computer to select the second plug-in program by passing information regarding the call to a service manager program via a service management interface of the abstract call model, wherein the service manager program processes the information to determine the characteristic, and selects the second plug-in program responsive to the characteristic from a registry of the plug-in programs.

28. A product according to claim 23, wherein the request comprises an address of the second party to whom the call is to be placed, and wherein the instructions cause the computer to parse the address to determine the second communication service provider that should be selected.

29. A product according to claim 28, wherein the address comprises a telephone number, and wherein the instructions cause the computer to identify the second communication provider based on a portion of the telephone number.

30. A product according to claim 23, wherein the instructions cause the computer to determine a communication protocol to be used in communicating with the second party, and to choose the second communication service provider such that the second communication service provider supports the communication protocol.

31. A product according to claim 30, wherein the instructions cause the computer to communicate with the first party via the first communication service provider using a first communication protocol, and wherein the communication protocol used in communicating with the second party comprises a second communication protocol, different from the first protocol.

32. A product according to claim 31, wherein one of the first and second communication protocols comprises a circuit-switched network protocol, while the other of the first and second communication protocols comprises a packet-switched network protocol.

33. A product according to claim 23, wherein the instructions cause the computer to select the second communication service provider by applying a selection rule to the characteristic in order to determine the second communication service provider to be selected.

* * * * *